Feb. 26, 1963 L. FELDMAN 3,079,463

STEREO SOUND SYSTEM

Filed Feb. 10, 1960

INVENTOR

Leonard Feldman

BY James and Franklin

ATTORNEYS

United States Patent Office 3,079,463
Patented Feb. 26, 1963

3,079,463

STEREO SOUND SYSTEM

Leonard Feldman, Flushing, N.Y., assignor to Crosby Electronics, Inc., Syosset, N.Y., a corporation of New York Filed Feb. 10, 1960, Ser. No. 7,922
6 Claims. (Cl. 179—1)

This invention relates to stereo sound systems, and more particularly to the balancing of the outputs of stereo amplifiers.

The primary object of the present invention is to facilitate adjustment of the volume controls of stereo amplifiers to obtain balanced outputs. A further object is to facilitate adjustment of the tone controls of stereo amplifiers to obtain outputs which are balanced in that respect. Still another object is to provide apparatus for balancing the outputs of stereo amplifiers aurally, and to do so with great accuracy. Still another object is to achieve these results by the addition of a minimum number of inexpensive components.

To accomplish the foregoing general objects, and other more specific objects which will hereinafter appear, my invention resides in the stereo amplifier system, and the elements thereof and their relation one to another, as are more particularly described in the following specification. The specification is accompanied by a drawing in which.

Figures 1, 2:
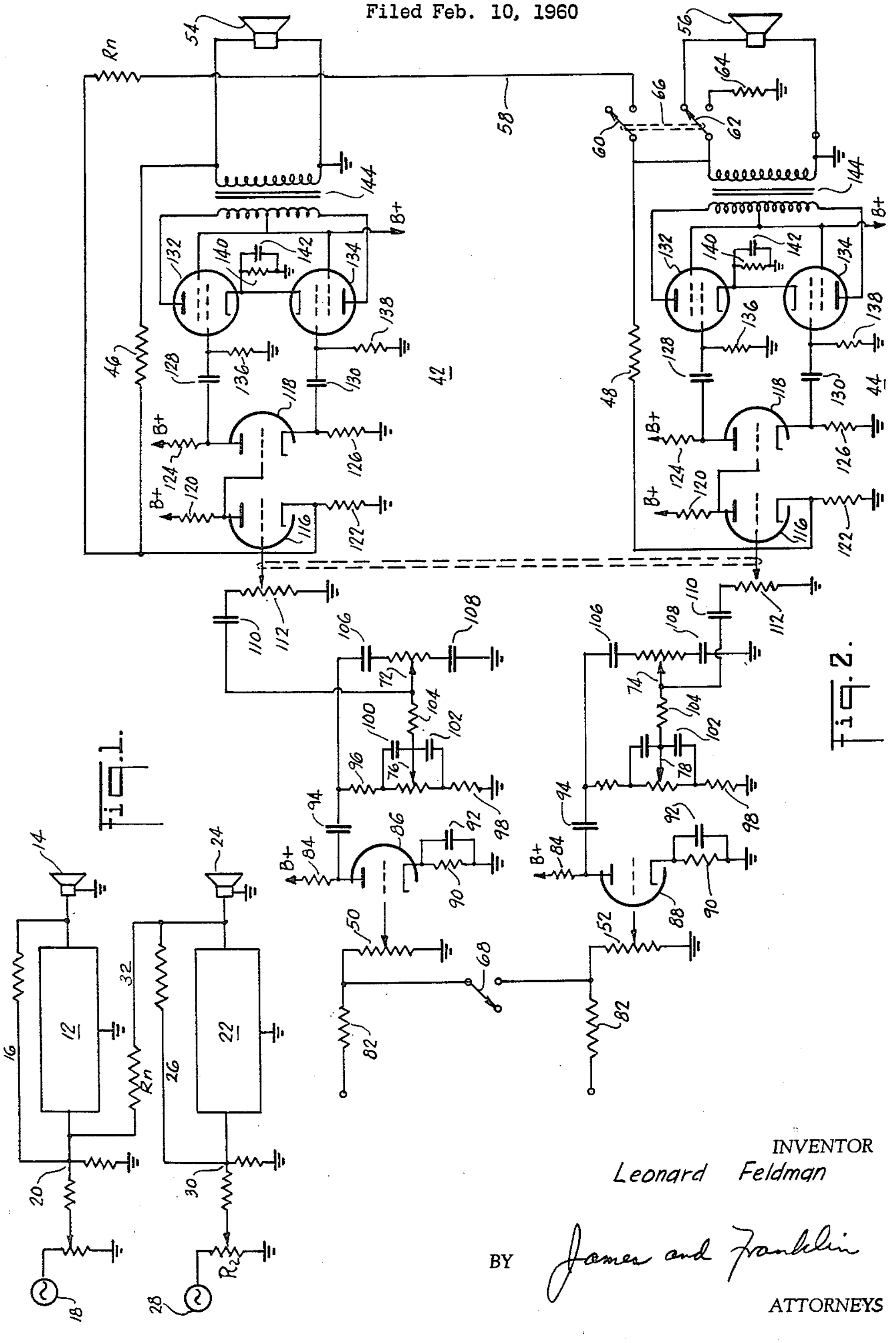
FIG. 1 is a simplified diagram explanatory of the invention.
FIG. 2 is a more detailed wiring diagram showing a specific example of the invention.

Referring to FIG. 1, conventional amplifiers such as that indicated by box 12, employ a degree of negative voltage feedback. A fraction of the output voltage appearing at the terminals of speaker 14 is fed back through a feedback circuit 16, with a 180° phase change compared to the input voltage from source 18 or existing at the point 20. This results in lower over-all amplification, but there is a reduction in distortion and hum. Because of circuit limitations such as phase shifts in variout parts of the circuits at various frequencies, there is a limit to the amount of negative feedback that can be applied, and even if for some reason one wanted to do so, the gain could not be reduced to zero, because long before that oscillation would take place at some frequency at which the feedback voltage has undergone another 180° phase shift and has therefore become regenerative.

In FIG. 1 a sterephonic sound system is illustrated, with the amplifier 22, speaker 24, feedback circuit 26, audio frequency source 28, and connection point 30, all corresponding to the similar parts of the upper amplifier 12. For convenience of reference and description, the upper parts may be called channel A, and the lower parts channel B.

In addition to the apparatus so far described, which is conventional, a voltage from the output of amplifier 22 or from channel B is applied through a novel negative crossover feedback circuit 32 to the input of amplifier 12 or channel A. This is in addition to the normal negative feedback of amplifier 12 through its feedback circuit 16.

I have found that the negative crossover feedback through circuit 32 may be made as small or as large as desired because it is outside the closed loop of amplifier 12, and will therefore cause no oscillatory condition. If the circuit elements are so arranged that equal input voltages supplied to channel A and channel B cause the negative crossover feedback voltage through circuit 32 to be exactly equal but out of phase with the input voltage to amplifier 12, the signal appearing at the output of amplifier 12 will be zero. The resistor $R_n$ is the key component, and is calculated to meet the above condition. Essentially, it divides the output voltage by the gain of the amplifier, thus reducing the negative crossover feedback voltage to an amount equal the input voltage.

Once the resistor $R_n$ has been fixed, the volume control of channel B, in this case the potentiometer $R_2$, can be adjusted until no acoustic output is heard from speaker 14. When this condition is met, the operator is assured that the electrical outputs from amplifiers 12 and 22 are identical. The adjustment may be performed under a single sinusoidal tone, or more conveniently under musical listening conditions. The channels are given the same input, and if the gains of amplifiers 12 and 22 are identical, no sound will be heard from speaker 14.

A practical circuit for the present purpose is illustrated in FIG. 2 of the drawing, referring to which the stereo system comprises stereo amplifiers generally designated 42 and 44. These have negative feedback connections which may be conventional, and which are here shown at 46 and 48. The individually adjustable volume controls are provided at 50 and 52. The amplifiers drive speakers 54 and 56. The negative crossover feedback connection from the output of amplifier 44 to the input of amplifier 42 is shown at 58, and this connection may be closed or made operative by means of a normally open switch 60. The negative crossover feedback line 58 includes a resistor $R_n$ as previously described. The switch 60 permits the feedback connection 58 to be temporarily closed, at which time the volume control 52 may be adjusted until there is a null or substantially null output from speaker 54, which is the channel A speaker.

It is convenient to disable the channel B speaker (speaker 56), when listening for the null or minimum output from speaker 54, and for this purpose a switch 62 is provided which is normally closed to its upper contact, thereby energizing speaker 56, but which may be depressed to its lower contact at which time the output is grounded through an appropriate load resistor 64. The switches 60 and 62 are preferably connected together for simultaneous movement, as indicated by the broken line 66, in which case speaker 56 is disabled whenever the feedback connection 58 is made operative.

It is also convenient to supply a monophonic summing input or common input to channels A and B during the balancing adjustment. Some stereo systems have a switch for this purpose, and in any case the present apparatus includes such a switch at 68. The switch is open when receiving a stereo input, and is closed when receiving a monophonic input, or a stereo input which is to be treated as monophonic, at which time the inputs are simply connected directly together.

The present system facilitates the balancing not only of volume controls but also of tone controls. In the particular circuit here shown there are separate treble controls and bass controls. The treble controls are indicated at 72 and 74, and the bass controls at 76 and 78. Any unbalance caused by the tone controls is secondary compared to the effect of the volume controls, and in practice the volume controls may be adjusted to achieve a minimum or substantially null output from speaker 54, following which the tone control 74, 78 may be adjusted to correct the output even further.

Considering the apparatus in greater detail, the switches 60 and 62 preferably have a spring return, in addition to being ganged together, so that only momentary contact is made during the actual adjustment. The procedure is as follows. First the switch 68 is closed to supply a monophonic or summing input to the two channels. The operator then increases the setting of volume control 50 until a desired level of sound is heard from speaker 54. He then depresses the switch 60, 62 and increases the setting of volume control 52. As he does so, a distinct and sharp null is heard in speaker 54, it being understood that speaker 56 has meanwhile been disabled by the opening of switch 62. The null is extremely sharp, and a few degrees of rotation to either side of the null causes sound to emanate from speaker 54. When the operator is satisfied that he has achieved the minimum sound, he simply releases the switch 60, 62 and the outputs from both amplifiers 42 and 44 are then identical.

Theoretically the null should go to zero sound, but in practice nulls of about 45 decibels are achieved. The difference lies in the fact that slight differences in components between two supposedly identical amplifiers are sufficient to upset the phase response slightly at some frequencies in the audio frequency range. The operator's ability to achieve balance is increased by a factor equal to the amplification or gain in amplifier 42. If it has a gain of 40 db (30 times), and the operator's hearing is such that he would normally be able to get within 3 db of true balance, with the aid of the present circuit he is able to arrive within 0.1 db of true balance. Normally most operators would find it difficult to perceive a difference in level between two channels when the difference is less than 3 decibels, but such an unbalance is enough to spoil a good part of the desired stereophonic effect. The circuit here shown permits the operator to aurally balance the two output signals within a fraction of one decibel.

If the input to channels A and B is music, thereby covering a wide audio frequency range, a true null can be obtained only if the gains of the two amplifiers are identical at all frequencies being handled; e.g., if one amplifier has its treble control at a higher setting than the treble control of the other amplifier, a null may be obtained for lower frequencies as volume control 52 is adjusted with respect to volume control 50, but not for the treble or higher pitched tones. The present apparatus is therefore applicable to the balancing of the frequency response of the two amplifiers by means of their tone controls, as well as to the balancing of their volume controls.

The quantitative values of the components used in FIG. 2 are given hereinafter, but this is solely by way of specific example of the invention, and is not intended to be in limitation thereof. The series resistors 82 have a value of 56K ohms. The volume control potentiometers 50 and 52 are 500K ohms. The tubes 86 and 88 are the two halves of a type 12AU7 tube. The plate resistors 84 have a value of 220K ohms. The cathode resistors 90 have a value of 1.2K ohms and are shunted by capacitors 92 having a value of 25 mf. Coupling capacitors 94 have a value of 0.047 mf.

The bass control comprises resistors 96 at 120K ohms, potentiometers 76 and 78 at 500K ohms, resistors 98 at 22K ohms, capacitors 100 at 0.005 mf., and capacitors 102 at 0.02 mf. The series resistors 104 are 47K ohms. The treble controls include capactiors 106 at 560 mmf., potentiometers 72 and 74 at 500K ohms and capacitors 108 at 2200 mmf.

The coupling capacitors 110 are 0.047 mf. These lead to volume control potentiometers 112 which are ganged together as shown by dotted line 114 for simultaneous operation to act as a master volume control. The potentiometers 112 have a value of 500K ohms.

The tubes 116 and 118 are the halves of a type 12AX7 tube. The plate resistors 120 are 470K ohms while the cathode resistors 122 are 680 ohms.

The plate resistors 124 and the cathode resistors 126 are each 100K ohms. The coupling capacitors 128 and 130 are each 0.02 mf.

The power amplifier tubes operating in push-pull and indicated at 132, 134 are each a type 7189 output tube. The grid resistors 136 and 138 are each 470K ohms. The cathode circuits comprise resistors 140 having a value of 150K ohms, and capacitors 142 having a value of 25 mf.

The negative feedback resistors 46 and 48 have a value of 15K ohms. The negative crossover feedback resistor $R_n$ has a value of 10K ohm held to a precision or tolerance of plus or minus 5%. The load resistor 64 has a value of 15 ohms and is designed to handle or dissipate 10 watts of power.

It is believed that the construction, theory, and method of operation of my improved stereo system for balancing the outputs of stereo amplifiers, as well as the advantages thereof, will be apparent from the foregoing detailed description. It will also be apparent that while I have shown and described my invention in a preferred form, changes may be made in the specific circuit shown, without departing from the scope of the invention, as sought to be defined in the following claims. For convenience, the claims refer to channel A and channel B, but it will be understood that these may be reversed, and that either channel may be used to crossover feed back to the other. Moreover, while reference is made to adjusting the volume control (or tone control) of channel B, the control of either channel may be adjusted to achieve balance or equality as between the two channels. Of course, if one channel has been preliminarily adjusted to a desired value, the balance preferably is obtained by then adjusting the other channel.

I claim:

1. A stereo system comprising stereo amplifiers having individual volume controls, for driving stereo speakers A and B, said amplifiers being channel A and channel B amplifiers, each having an input and an output a normally open negative crossover feedback connection from the output of channel B amplifier to the input of channel A amplifier, said negative crossover feedback connection serving to produce a null or substantially null output from channel A when the A and B inputs and outputs are balanced, and means to temporarily close the said crossover feedback connection, whereby the volume control of channel B may be adjusted until there is a null or substantially null output from amplifier A in order to balance the amplifier outputs.

2. A stereo system comprising stereo amplifiers having individual volume controls, and tone controls, for driving stereo speakers, A and B, said amplifiers being channel A and channel B amplifiers, each having an input and an output, a normally open negative crossover feedback connection from the output of channel B amplifier to the input of channel A amplifier, said negative crossover feedback connection serving to produce a null or substantially null output from channel A when the A and B inputs and outputs are balanced, and means to temporarily close the said crossover feedback connection, whereby the volume control and tone control of channel B may be adjusted until there is a null or substantially null output from amplifier A in order to balance the amplifier outputs.

3. A stereo system comprising stereo amplifiers having individual volume controls, and negative feedback circuits, for driving stereo speakers A and B, said amplifiers being channel A and channel B amplifiers, each having an input and an output, a normally open additional negative crossover feedback connection from the output of channel B amplifier to the input of channel A amplifier, said negative crossover feedback connection serving to produce a null or substantially null output from channel A when the A and B inputs and outputs are balanced, and means to temporarily close the said additional crossover feedback connection and at the same time to disconnect the output to speaker B, whereby the volume control of channel B may be adjusted until there is a null or substantially null output from speaker A in order to balance the amplifier outputs.

4. A stereo system comprising stereo amplifiers having individual volume controls, tone controls, and negative feedback circuits, for driving stereo speakers A and B, said amplifiers being channel A and channel B amplifiers, each having an input and an output, a normally open additional negative crossover feedback connection from the output of channel B amplifier to the input of channel A amplifier, said negative crossover feedback connection serving to produce a null or substantially null output from channel A when the A and B inputs and outputs are balanced, and means to temporarily close the said additional crossover feedback connection and at the same time to disconnect the output to speaker B, whereby the volume control and tone control of channel B may be adjusted until there is a null or substantially null output from speaker A in order to balance the amplifier outputs.

5. A stereo system comprising stereo amplifiers having individual volume controls, and negative feedback circuits, for driving stereo speakers A and B, said amplifiers being channel A and channel B amplifiers, each having an input and an output, switching means for supplying a monophonic summing input to the amplifiers, a normally open negative crossover feedback connection from the output of channel B amplifier to the input of channel A amplifier, said negative crossover feedback connection serving to produce a null or substantially null output from channel A when the A and B inputs and outputs are balanced, and means to temporarily close the said additional crossover feedback connection and at the same time to disconnect the output to speaker B, whereby the volume control of channel B may be adjusted until there is a null or substantially null output from speaker A in order to balance the amplifier outputs.

6. A stereo system comprising stereo amplifiers having individual volume controls, tone controls, and negative feedback circuits, for driving stereo speakers A and B, said amplifiers being channel A and channel B amplifiers, each having an input and an output, switching means for supplying a monophonic summing input to the amplifiers, a normally open negative crossover feedback connection from the output of channel B amplifier to the input of channel A amplifier, said negative crossover feedback connection serving to produce a null or substantially null output from channel A when the A and B inputs and outputs are balanced, and means to temporarily close the said additional crossover feedback connection and at the same time to disconnect the output to speaker B, whereby the volume control and tone control of channel B may be adjusted until there is a null or substantially null output from speaker A in order to balance the amplifier outputs.

References Cited in the file of this patent

UNITED STATES PATENTS

| | | |
|---|---|---|
| 1,472,455 | Blattner | Oct. 30, 1923 |
| 2,393,885 | Claassen | Jan. 29, 1946 |
| 2,505,585 | Silent | Apr. 25, 1950 |